(12) United States Patent
Mii et al.

(10) Patent No.: US 10,707,970 B2
(45) Date of Patent: Jul. 7, 2020

(54) WAVELENGTH DE-MULTIPLEXING SYSTEM AND OPTICAL RECEIVER MODULE

(71) Applicants: SUMITOMO ELECTRIC INDUSTRIES, LTD., Osaka-shi (JP); SUMITOMO ELECTRIC DEVICE INNOVATIONS, INC., Yokohama-shi (JP)

(72) Inventors: Kazuaki Mii, Osaka (JP); Hiroshi Hara, Osaka (JP); Fumihiro Nakajima, Yokohama (JP)

(73) Assignees: Sumitomo Electric Industries, Ltd., Osaka-shi (JP); Sumitomo Electric Device Innovations, Inc., Yokohama-shi (JP)

( * ) Notice: Subject to any disclaimer, the term of this patent is extended or adjusted under 35 U.S.C. 154(b) by 0 days.

(21) Appl. No.: 16/152,566

(22) Filed: Oct. 5, 2018

(65) Prior Publication Data

US 2019/0109650 A1 Apr. 11, 2019

(30) Foreign Application Priority Data

Oct. 6, 2017 (JP) .................. 2017-196222

(51) Int. Cl.
*H04B 10/69* (2013.01)
*G02B 6/42* (2006.01)
(Continued)

(52) U.S. Cl.
CPC ....... *H04B 10/691* (2013.01); *G02B 6/29367* (2013.01); *G02B 6/4215* (2013.01);
(Continued)

(58) Field of Classification Search
CPC ...... H04B 10/691; H04B 10/66; H04B 10/69; H04B 10/142; H04B 10/152; G02B 27/09;
(Continued)

(56) References Cited

U.S. PATENT DOCUMENTS 6,477,293 B1 * 11/2002 Golub .................. G02B 6/2931
  385/15
8,303,195 B2 * 11/2012 Adachi ................ G02B 6/4204
  385/73
(Continued)

FOREIGN PATENT DOCUMENTS

JP 2009-198958 A 9/2009

OTHER PUBLICATIONS

U.S. Appl. No. 16/150,332, filed Oct. 3, 2018.

*Primary Examiner* — Abbas H Alagheband
(74) *Attorney, Agent, or Firm* — Baker Botts L.L.P.; Michael A. Sartori (57) ABSTRACT

A wavelength de-multiplexing system that receives a wavelength multiplexed signal and generates electrical signals corresponding to the optical signals is disclosed. The optical receiver module includes a lens, a lens unit, and an optical de-multiplexer (O-DeMux). The lens converts the wavelength multiplexed signal into a quasi-collimated beam. The lens unit narrows a diameter of the quasi-collimated beam. The O-DeMux de-multiplexes the narrowed quasi-collimated beam coming from the lens unit by wavelength selective filters (WSFs) each having optical distances from the lens unit different from each other.

4 Claims, 10 Drawing Sheets

(51) Int. Cl.
*G02B 6/293* (2006.01)
*G02B 21/28* (2006.01)
*H04B 10/60* (2013.01)
*H04J 14/06* (2006.01)

(52) U.S. Cl.
CPC .............. *G02B 6/293* (2013.01); *G02B 21/28* (2013.01); *H04B 10/60* (2013.01); *H04J 14/06* (2013.01)

(58) Field of Classification Search
CPC .... G02B 6/42; G02B 6/29367; G02B 6/4215; H04J 14/02
USPC .......................................................... 398/79
See application file for complete search history.

(56) References Cited

U.S. PATENT DOCUMENTS

| | | | |
|---|---|---|---|
| 8,540,437 B2 * | 9/2013 | Lee | G02B 6/4215 385/31 |
| 9,197,345 B2 | 11/2015 | Nakajima et al. | |
| 9,229,206 B2 * | 1/2016 | Tatsuno | G02B 13/16 |
| 9,363,021 B2 | 6/2016 | Fujimura et al. | |
| 10,025,173 B2 * | 7/2018 | Tatsuno | G02B 21/28 |
| 2010/0278482 A1 * | 11/2010 | Adachi | G02B 6/4204 385/33 |
| 2013/0148970 A1 * | 6/2013 | Nakajima | H04J 14/02 398/79 |
| 2014/0346323 A1 * | 11/2014 | Fujimura | G01J 1/44 250/208.2 |
| 2015/0365175 A1 | 12/2015 | Kawamura et al. | |
| 2015/0365176 A1 | 12/2015 | Kawamura et al. | |
| 2016/0170145 A1 | 6/2016 | Kawamura et al. | |
| 2016/0299170 A1 * | 10/2016 | Ito | G02B 26/10 |
| 2017/0131474 A1 * | 5/2017 | Dannenberg | H04J 14/02 |
| 2017/0134099 A1 | 5/2017 | Hara et al. | |
| 2018/0212708 A1 * | 7/2018 | Tian | H04J 14/06 |
| 2018/0314006 A1 * | 11/2018 | Tang | G02B 6/2931 |

* cited by examiner

WAVELENGTH DE-MULTIPLEXING SYSTEM AND OPTICAL RECEIVER MODULE

CROSS REFERENCE TO RELATED APPLICATION

The present application is based on and claims the benefit of priority of Japanese Patent Application No. 2017-196222, filed on Oct. 6, 2017, the entire content of which is incorporated herein by reference.

TECHNICAL FIELD

1. Field of Invention

The present invention relates to wavelength de-multiplexing system and an optical receiver module, in particular, an optical receiver module that receives a wavelength multiplexed signal multiplexing a plurality of optical signals each having wavelengths different from each other, and generates electrical signals corresponding to the optical signals.

BACKGROUND

2. Background Arts

An advanced optical communication system has requested in optical modules implemented therein to be operable faster and faster. The transmission speed of such an optical communication system reaches 40 Gbps and sometimes exceeds 100 Gbps. One solution for such an extremely high speed communication system is a wavelength division multiplexing (WDM) configuration. When an optical transceiver installs two or more optical modules each responding only one wavelength, such an optical transceiver inevitably enlarges physical dimensions thereof. An optical module implementing two or more semiconductor optical devices corresponding to optical signals and electrical circuits within a housing has been requested in the field in order to save a footprint of an optical transceiver.

A Japanese Patent Application laid open No. JP2009-198958A has disclosed an optical module applicable to the WDM system. The optical module disclosed therein provides a wavelength selective filter (WSF) that divides eight (8) optical signals multiplexed in a wavelength multiplexed signal into two portions, one of which multiplexes the optical signals with longer four wavelengths, while another portion multiplexes the rest optical signals with shorter four wavelengths. These two wavelength multiplexed signals are de-multiplexed by optical de-multiplexers (O-DeMuxes) each apart from the WSF by distances equal to each other. However, the WSF is disposed such that the incident surface thereof makes a half right angle (45°) against the optical axis of the wavelength multiplexed signal.

The wavelength selective function of a WSF strongly depends on the incident angle. Performances or specifications of the WSF are those measured at the incident angle of 0°, and degrades as the incident angle becomes larger. In order to maintain the wavelength selective function of the WSF, a number of layers constituting the filter is necessary to be increased. But the increased number of the multi-layered filter inevitably lowers transmittance thereof. For instance, in order to satisfy the specification defined in the coarse wavelength division multiplexing (CWDM) system, the incident angle of the WSF is necessary to be smaller than 20°, preferably smaller than 15° to securely discriminate optical signals. A greater incident angle for the WSF, the WSF possibly mixes an optical signal belonging in a neighbor channel.

Also, an optical coupling system is hard to be regarded to process an optical beam output from a point source. Even when the optical signal is processed by a collimating lens, the optical signal passing the collimating lens is never converted into a true collimated beam but becomes a quasi-collimated beam that forms a beam waist and diverges apart from the beam waist. When the de-multiplexed optical signals have optical paths different from each other, coupling efficiencies of the optical signals at optical detectors scatters depending on the optical paths.

SUMMARY

One aspect of the present invention relates to an wavelength de-multiplexing system that receives a wavelength multiplexed signal multiplexing optical signals each having wavelengths different from each other and generates electrical signals corresponding to the optical signals. The wavelength de-multiplexing system of the invention comprises a lens, a lens unit, and an optical de-multiplexer. The lens receives the wavelength multiplexed signal and converts this wavelength multiplexed signal into a quasi-collimated beam. The lens unit receives the quasi-collimated beam and outputs a quasi-collimated beam with a diameter smaller than a diameter of the quasi-collimated beam output from the lens. The optical de-multiplexer, which includes a plurality of wavelength selective filters each having optical distances against the lens unit different from each other, de-multiplexes the quasi-collimated beam output from the lens unit.

Another aspect of the present invention relates to an optical receiver module that generates electrical signals from optical signals each attributed to wavelengths different from each other and multiplexed into a wavelength multiplexed signal. The optical receiver module of the invention comprises a lens, a wavelength selective unit (WS unit), a lens unit, and first and second optical de-multiplexers (O-De-Muxes). The lens converts the wavelength multiplexed signal into a quasi-collimated signal having a beam waist. The WS unit includes a wavelength selective filter (WSF) that divides the wavelength multiplexed signal output from the lens into a partial wavelength multiplexed signal and another partial wavelength multiplexed signal, where the partial wavelength multiplexed signal multiplexes a part of the optical signals attributed to longer wavelengths. The another partial wavelength multiplexed signal multiplexes a rest of the optical signals attributed to shorter wavelengths. The lens unit, which is provided downstream of the WS unit, adjusts a field diameter of at least one of the partial wavelength multiplexed signal and the another partial of the wavelength multiplexed signal. The first O-DeMux de-multiplexes the partial wavelength multiplexed signal into the part of the optical signals and outputs the part of the optical signals each from positions different from each other. The second O-DeMux de-multiplexes the another partial wavelength multiplexed signal into the rest of the optical signals and outputs the rest of the optical signals each from positions different from each other.

BRIEF DESCRIPTION OF THE DRAWINGS

The foregoing and other purposes, aspects and advantages will be better understood from the following detailed description of a preferred embodiment of the invention with reference to the drawings, in which:

FIG. 5 schematically illustrates the wavelength de-multiplexing system, in particular, FIG. 5 illustrates a profile of the beam diameter of the wavelength multiplexed signal output from the coupling fiber;

FIG. 8 schematically illustrates the optical de-multiplexing system implementing the lens units, in particular, FIG. 8 illustrates the profiles of the beam diameters in a portion downstream of the lens units;

DESCRIPTION OF EMBODIMENT

Next, embodiment according to the present invention will be described referring to drawings. The present invention, however, is not restricted to the embodiment and has a scope defined in claims and all changed and modifications with the claims and equivalent thereto. Also, in the description of the drawings, numerals or symbols same with or similar to each other will refer to elements same with or similar to each other without duplicating explanations.

Figure 1:
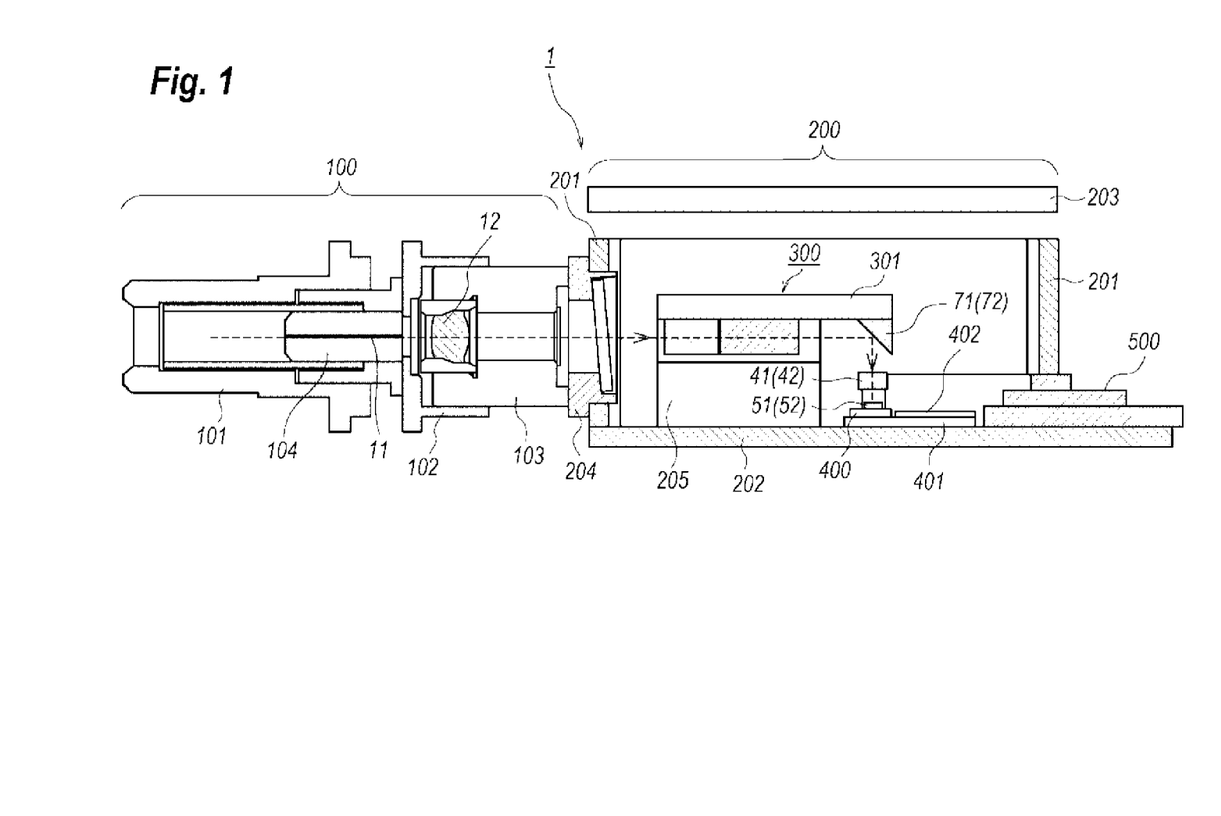
FIG. 1 is a cross sectional view of an optical receiver module according to embodiment of the present invention.

FIG. 1 is a cross sectional view of an optical receiver module 1 according to embodiment of the present invention. The optical receiver module 1 receives a wavelength multiplexed signal that multiplexes a plurality of optical signals each having wavelengths of $\lambda_1 \sim \lambda_8$ and generates electrical signals corresponding to the respective optical signals. The optical receiver module 1 includes a coupling portion 100 optically coupled with an external fiber, a housing 200 that encloses optical and electrical components therein, and a terminal portion 500 that enables the optical receiver module 1 to communicate with an outside of the housing.

The coupling portion includes a sleeve 101 that receives a ferrule secured in a tip of the external fiber, a lens holder 103 for fixing coupling portion 100 to the housing 200, and a joint sleeve 102 for assembling the sleeve 101 with the lens holder 103.

The housing 200, which has a rectangular outer appearance, includes a frame 201, a bottom 202, and a lid 203, where those elements form a space within which the optical and electrical components are hermetically enclosed. The front wall of the frame 201 provides a bush 204 that provides a plane front surface and a reference plane for assembling the optical components within the space. The bottom 202 may be made of metal with good thermal conductivity and thermal expansion co-efficient comparable to those of the optical components. The bottom 202 may be made of copper molybdenum (CuMo), copper tungsten (CuW), and so on. The lid 203 is fixed on a top of the frame 201 after the optical and electrical components are installed with the space.

The terminal portion 500, which may stack ceramic substrates, is assembled with the frame 201 such that the terminal portion 500 is fit within the rear of the frame 201. In the description below, a direction defined by "front" and/or "forward" corresponds to a side where the coupling portion 100 is assembled to the housing 200, while, another direction defined by "rear" and/or "back" corresponds to a side where the terminal portion 500 is assembled with the hosing 200. However, those definitions are only for explanation sake and could not affect the scope of the present invention.

The lens holder 103 is fixed to the front wall of the housing 200 through the bush 204, and fixes the sleeve 101 through the joint sleeve 102 thereto. That is, the joint sleeve 102 may optically align the optical components enclosed within the housing 200 with the external fiber secured in the sleeve 101.

The sleeve 101 provides a stub 104 in one end thereof, while receives the ferrule secured in the tip of the external fiber in another end. The external fiber inserted within the sleeve 101 may optically couple with a coupling fiber 11 secured in a center of the stub 104. Specifically, the external fiber secured in the ferrule in a tip thereof may optically couple with the coupling fiber 11 by the ferrule making the physical contact against the coupling fiber 11. The lens holder 103 encloses a first lens 12 that converts the wavelength multiplexed signal output from the external fiber through the coupling fiber 11 into a quasi-collimated beam. The wavelength multiplexed signal output from the first lens 12 as the quasi-collimated beam enters within the housing 200 through a window provided in the bush 204 for hermetically sealing the space within the housing 200.

The first lens 12, which is a type of concentrating lens, is able to generate a collimated beam when the first lens 12 in a focal length thereof becomes equal to a distance from the end of the coupling fiber 11 that outputs the wavelength multiplexed signal. However, because the end of the coupling fiber 11 is hard to be regarded as a point optical source, an optical beam output from the first lens 12 becomes a quasi-collimated beam with a beam waist even when the first lens 12 sets the focal point thereof in the end of the coupling fiber 11. Instead, the first lens 12 of the present embodiment is placed in a position where the distance from the end of the coupling fiber 11 is slightly longer than the focal length of the first lens 12; accordingly, the wavelength multiplexed signal output from the first lens 12 becomes a concentrated beam.

The housing 200 encloses an optical de-multiplexing assembly 300 that de-multiplexes the wavelength multiplexed signal output from the first lens 12. The optical de-multiplexing assembly 300 includes a carrier 301 on which optical components of the optical de-multiplexing assembly 300 are mounted. The carrier 301 is placed on the support 205 such that the primary surface thereof, where the optical components are mounted, faces the bottom 202 apart therefrom as leaving a room against the bottom 202 where the electrical components, 51 and 52, are mounted on the bottom 202 through carriers, 400 and 401.

The optical signals de-multiplexed by the optical de-multiplexing assembly 300 advance toward the bottom 202 reflected by the mirrors, 71 and 72. The room beneath the optical de-multiplexing assembly 300 may place the arrayed lenses, 41 and 42, and the arrayed PDs, 51 and 52, on the bottom 202 through the respective carriers, 400 and 401. The arrayed PDs, 51 and 52, receive the optical signals each reflected by the mirrors, 71 and 72, through the arrayed lenses, 41 and 42.

In the optical receiver module 1 of the embodiment, the optical de-multiplexing assembly 300 is placed on the support 205 to be parallel to the bottom 202 and apart therefrom leaving the room thereunder. Moreover, the arrayed lenses, 41 and 42, and the arrayed PDs, 51 and 52, are vertically stacked in the room, which may save a footprint for components on the bottom 202 and generate an enough room for placing the electrical components 402 which may be trans-impedance amplifiers for amplifying electrical signals output from the arrayed PDs, 51 and 52, on the bottom 202 behind the arrayed PDs, 51 and 52.

Figure 2:
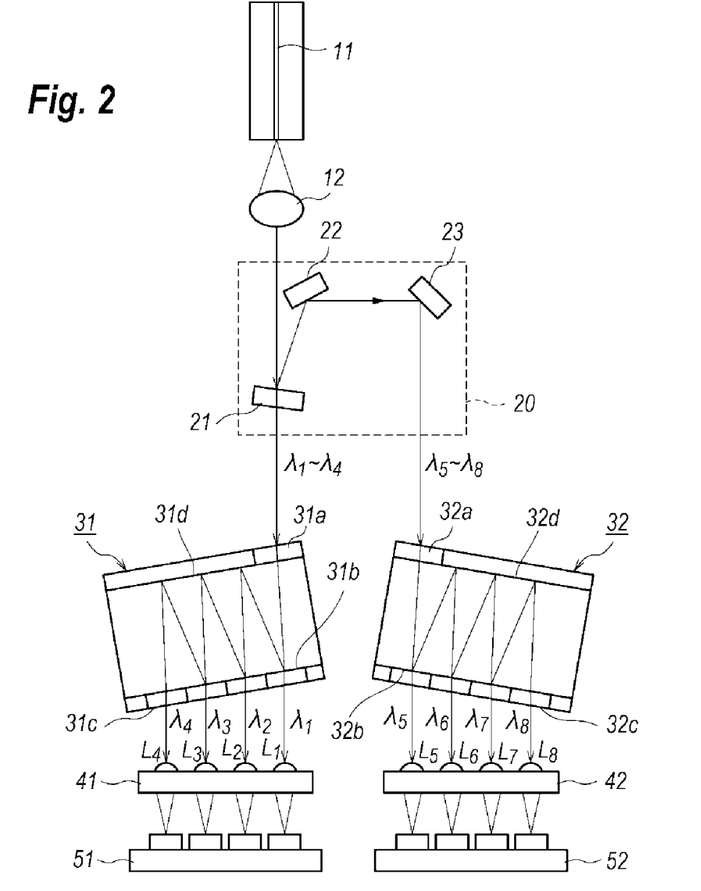
FIG. 2 schematically illustrates an optical de-multiplexing assembly without any lens unit according to embodiment of the present invention.

Next, the optical de-multiplexing assembly 300 installed within the housing 200 will be described in detail. FIG. 2 schematically illustrates an optical de-multiplexing assembly 300 without any lens units according to embodiment of the present invention. The carrier 301 of the optical de-multiplexing assembly 300 mounts a wavelength selective (WS) unit 20 as a first stage of the wavelength de-multiplexing, and a first and second optical de-multiplexers (O-DeMuxes), 31 and 32, as a second stage of the optical de-multiplexing.

The coupling fiber 11 outputs a wavelength multiplexed signal that multiplexes eight optical signals each having wavelengths, $\lambda_1 \sim \lambda_8$, different from each other. The first lens 12 provides this wavelength multiplexed signal to the first stage of the WS unit 20 as a quasi-collimated beam. The WS unit 20 includes a wavelength selective filter (WSF) 21, and two mirrors, 22 and 23. The WSF 21 divides the wavelength multiplexed signal coming from the first lens 12 into two partial wavelength multiplexed signals, one of which transmits the WSF 21 and multiplexes partial optical signals with shorter wavelengths, $\lambda_1 \sim \lambda_4$; while, the other is reflected by the WSF 21 and multiplexes the another partial optical signals with longer wavelengths, $\lambda_5 \sim \lambda_8$.

The partial wavelength multiplexed signal having shorter four wavelengths, $\lambda_1 \sim \lambda_4$, enters an input port 31a of the first O-DeMux 31. The another partial wavelength multiplexed signal having longer four wavelengths, $\lambda_5 \sim \lambda_8$, is reflected twice at the mirrors, 22 and 23, so as to make an optical axis thereof parallel to the optical axis of the partial wavelength multiplexed signal and finally enter the second O-DeMux 32 through an input port 32a thereof.

The first O-DeMux 31 may de-multiplex the partial wavelength multiplexed signal multiplexing the optical signals with shorter four wavelengths, and outputs the optical signals having the wavelengths, $\lambda_1$, $\lambda_2$, $\lambda_3$, $\lambda_4$, from the output port 31c, exactly, from respective positions different from each other in the output port 31c. The optical signals thus output from the first O-DeMux 31 enter respective PD elements in the arrayed PD 51 through respective lens element in the arrayed lens 41. Similarly, the second O-DeMux 32 de-multiplexes the another partial wavelength multiplexes signal with longer wavelengths, $\lambda_5$ to $\lambda_8$, and outputs the optical signals, $\lambda_5$, $\lambda_6$, $\lambda_7$, $\lambda_8$, from respective positions different from each other in the output port 32c. These optical signals enter the other PD elements in the arrayed PD 52 through the arrayed lens 42.

As understood for the optical de-multiplexing system shown in FIG. 2, an optical distance from the first lens 12 to the first O-DeMux 31 is different from an optical distance from the first lens 12 to the second O-DeMux 32, that is, the optical distance for the second O-DeMux 32 is longer than that for the first O-DeMux 31 by an amount necessary to shift the optical axis thereof. Also, the first O-DeMux 31 and the second O-DeMux 32 cause differences in optical paths for respective signals. That is, in the first O-DeMux 31, the optical signal with the first wavelength $\lambda_1$ has the shortest optical path from the input port 31a to the output port 31c thereof, while, the optical signal with the wavelength $\lambda_4$ has the longest optical path. Similarly, the optical signal with the wavelength $\lambda_5$ has the shortest optical path, while, the optical signal with the wavelength $\lambda_8$ has the longest path in the second O-DeMux 32. Symbols $L_1$ to $L_8$ appearing in FIG. 2 show optical paths for the respective lanes, and the lane of the optical signal with the wavelength $\lambda_8$ becomes longest optical path $L_8$.

Conventional optical de-coupling system, in order to compensate the optical path difference described above, sets the first lens 12 as a collimating lens by placing the first lens 12 such that the end of the coupling fiber 11 is aligned with the focal point of the first lens 12, and the second lens as a collimating lens.

However, even when the end of the coupling fiber 11 is placed on the focal point of the first lens 12, the wavelength multiplexed signal does not become a pure collimated beam, because only the pure collimated beam may be obtained in a case where an optical source may be regarded a point source. The end of the coupling fiber 11, which has a configuration of a single mode fiber, generally has a core diameter, or an effective field diameter, of several micron meters. Accordingly, the wavelength multiplexed signal output from the first lens 12 generally has a beam waist at a position between the first lens 12 and the first O-DeMux 31 and the second O-DeMux 32; then diverges therefrom.

Figure 3:
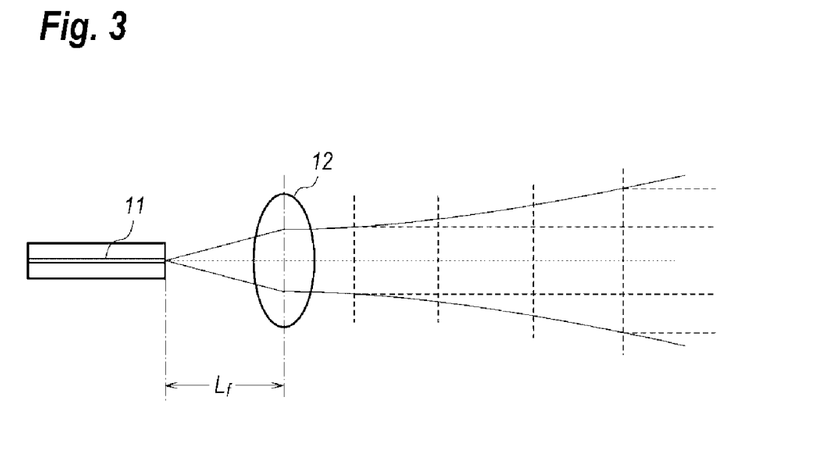
FIG. 3 schematically illustrates a beam profile of the wavelength multiplexed signal output from the end of the coupling fiber.

FIG. 3 schematically illustrates a beam profile of the wavelength multiplexed signal output from the end of the coupling fiber 11. As described above, the end of the coupling fiber 11, exactly, the core of the coupling fiber 11 has substantial dimensions, not regarded as point source. In such a system, setting the first lens 12 such that the end of the coupling fiber 11 is placed apart from the first lens 12 by the focal length $L_1$ thereof, the beam output from the first lens 12 may be regarded as a collimated beam only in a portion neighbor to the first lens 12; but the beam diverges apart from the first lens 12.

Figure 4:
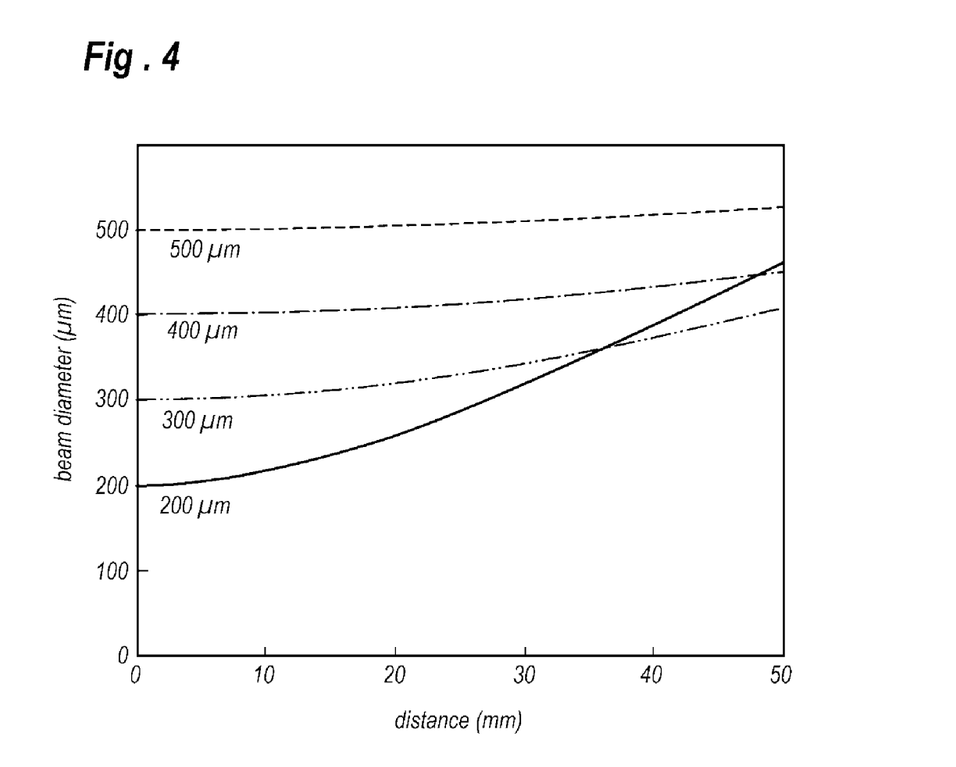
FIG. 4 shows relations of beam diameters against a distance form lenses when the lenses have various diameters and focal lengths.

FIG. 4 shows relations of beam diameters against a distance form lenses when the lenses have various diameters and focal lengths. For instance, a behavior denoted by 200 μm corresponds to a condition where a lens with a focal length of 200 μm is placed apart from the coupling fiber 11 by 200 μm. Similarly, the behavior denoted by 500 μm corresponds to a condition where a lens with a focal length of 500 μm is placed apart from the coupling fiber 11 by 500 μm. FIG. 4 shows beam diameters output from respective lenses, which is placed at 0 mm and have focal lengths shown in FIG. 4, while, the coupling fiber 11 is set apart from the respective lenses by distances shown in FIG. 4. For the lens with the focal length of 200 μm, the lens may generate substantially collimated beam at vicinity of the lens, namely within 5 mm, but the beam diverge therefrom. On the other hand, when the lens with the focal length of 500 μm is placed apart from the coupling fiber 11 by 500 μm, the lens may generate a substantially collimated beam independent of distances from the lens. However, an expanded lens diameter results in an expanded housing, because such a system inevitably requires a lens with an enlarged diameter and the coupling fiber 11 is inevitably placed apart from the lens.

On the other hand, the first and second O-DeMuxes, 31 and 32, according to present embodiment output the optical signals at respective positions in the output ports, 31c and 32c, thereof. That is, the optical signals output from the O-DeMuxes, 31 and 32, are necessary to be limited in diameters thereof in order to prevent interference between lanes. That is, the O-DeMuxes, 31 and 32, have a configuration that the wavelength selective filters WSFs, 31b and 32b, are provided just in front of the output port 31c. The partial wavelength multiplexed signal entering the input port 31a thereof advances to one of the WSFs 31b and the one of the WSFs 31b transmits only one of the optical signals with the wavelength $\lambda_1$ but reflects rest of the optical signals. The rest of the optical signals advance to the next WSF reflected by the mirror 31d. The next WSF 31b transmits only the optical signal with the wavelength $\lambda_2$ and reflect the rest optical signals. The first O-DeMux 31 iterates the operation above until all optical signals are output from the output port 31c. The second O-DeMux 32 may perform the operation same with those above described. Thus, the O-DeMuxes, 31 and 32, used in the present embodiment require the optical beams with limited beam diameters. When an optical beam entering the O-DeMuxes, 31 and 32, has a beam diameter greater than 300 μm, the O-DeMuxes, 31 and 32, may not show a designed wavelength de-multiplexing. On the other hand, as FIG. 4 explicitly show, a beam with a diameter thereof smaller than 300 μm, such a beam may be not regarded no longer as a collimated beam, nor a quasi-collimated beam, rather a divergent beam.

One solution for a subject above described is that a distance between the coupling fiber 11 and the first lens 12 may be adjusted so as to set a beam waist of the wavelength multiplexed signal output from the first lens 12 in a position between the shortest path L1 and the longest path L8, which may reduce differences in beam diameters of the respective optical signals.

Figure 5:
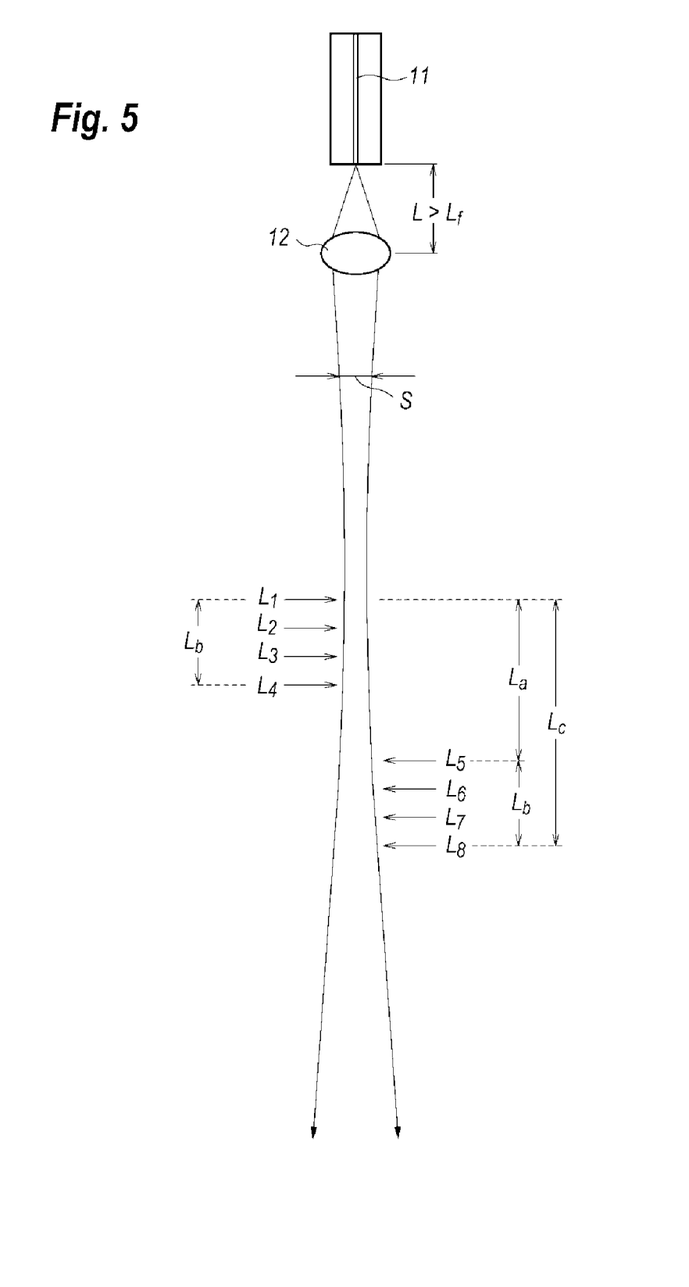

FIG. 5 schematically illustrates the optical de-coupling system, in particular, a profile of the beam diameter of the wavelength multiplexed signal output from the coupling fiber 11. The optical de-coupling system shown in FIG. 5 sets a distance L between the coupling fiber 11 and the first lens 12 that is longer than a focal length $L_f$ of the first lens, which means that the wavelength multiplexed signal output from the first lens 12 becomes a divergent beam with a beam waist, which will be called as a quasi-collimated beam. The beam output from the first lens 12 initially becomes a convergent beam, forms a beam waist, and then becomes a divergent beam apart from the beam waist. In FIG. 5, a distance $L_a$ is attributed to the WS unit 20, while, a distance $L_b$ is attributed to those caused within the O-DeMuxes, 31 and 32. Accordingly, a distance Lc between the longest optical path $L_8$ and the shortest optical path $L_1$ becomes a sum of two optical distances, $L_a+L_b$. Setting the beam waist between the shortest distance $L_1$ and the longest distance $L_8$, the difference between the beam diameters observed at the second lenses may be smaller.

First Embodiment

Figure 6:
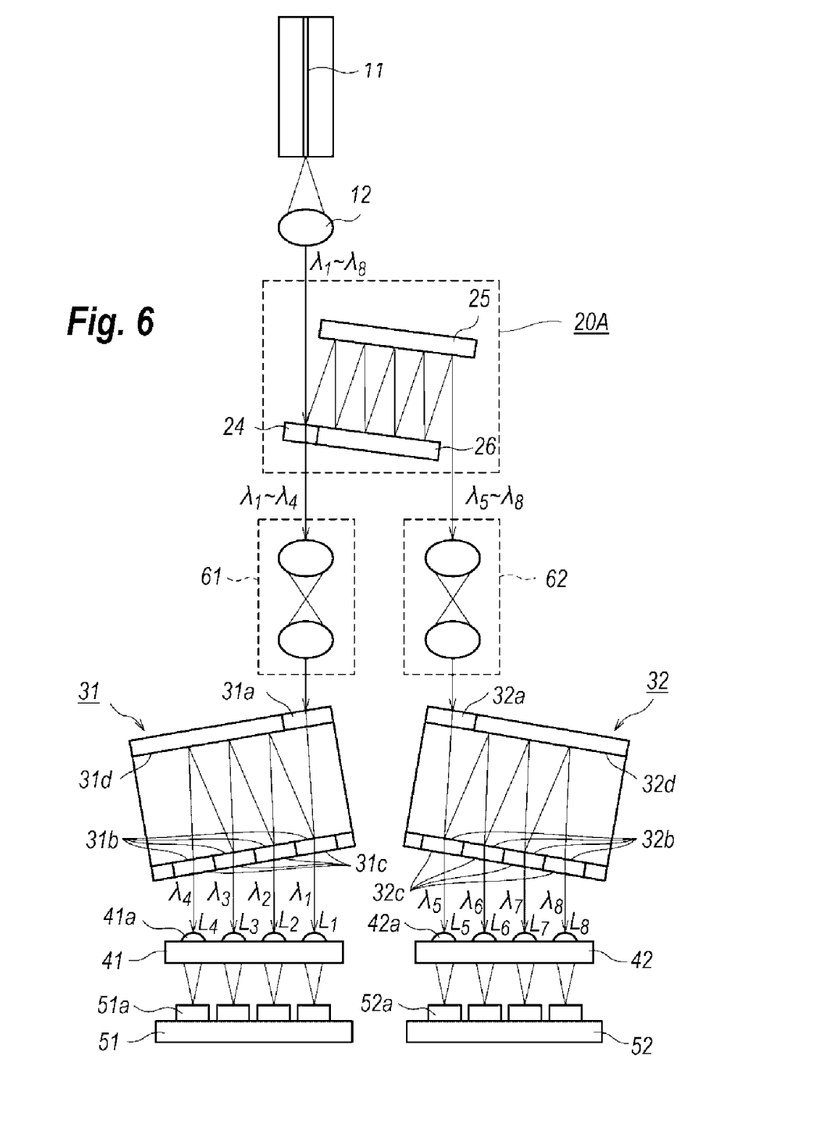
FIG. 6 schematically illustrates an optical de-multiplexing system implemented within the optical receiver module according to first embodiment of the present invention, where the optical de-multiplexing system may set a difference in the beam profiles, exactly, the beam diameters observed at the second lens further smaller compared with the optical system shown in FIG. 2.

FIG. 6 schematically illustrates an optical de-coupling system implemented within the optical receiver module according to the first embodiment of the present invention, where the optical de-coupling system may set a difference in the beam profiles, exactly, the beam diameters observed at the second lens further smaller compared with the optical de-coupling system shown in FIG. 2. The optical de-coupling system shown in FIG. 6 provides lens units, 61 and 62, between the WS unit 20A and the first and the second O-DeMuxes, 31 and 32, respectively. The lens units, 61 and 62, have a function to adjust the beam diameters of the wavelength multiplexed signals transmitting therethrough.

The wavelength multiplexed signal that multiplexes eight (8) optical signals each having wavelengths, $\lambda_1$ to $\lambda_8$, output from the coupling fiber 11 enters the WS unit 20A of the first stage passing through the first lens 12. The WS unit 20A includes a WSF 24 and two mirrors, 25 and 26, where the WSF 24 has a function same with the WSF 21 shown in FIG. 2. That is, the WSF 24 may transmit another wavelength multiplexed signal that multiplexes the optical signals attributed to the shorter four wavelengths, $\lambda_1$ to $\lambda_4$; while, reflect a portion of the wavelength multiplexed signal that multiplexes the optical signals attributed to the longer four wavelengths, $\lambda_5$ to $\lambda_8$. The multiple reflections between the two mirrors, 25 and 26, may shift the optical axis of the another partial wavelength multiplexed signal reflected by the WSF 24.

Figure 7A:
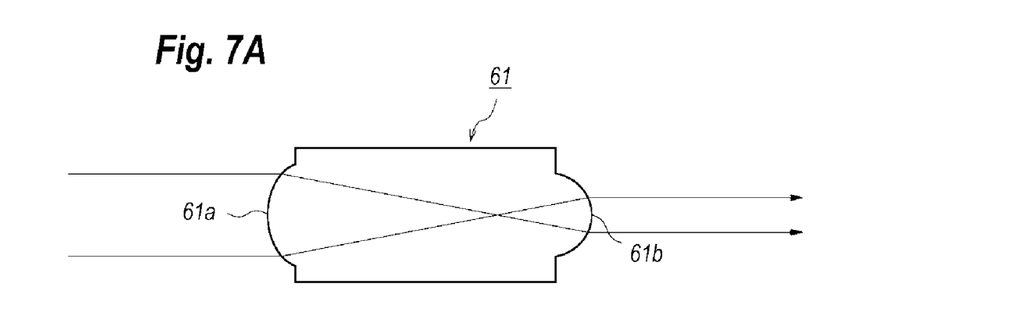
FIG. 7A and FIG. 7B schematically show examples of the lens units.
Figure 7B:
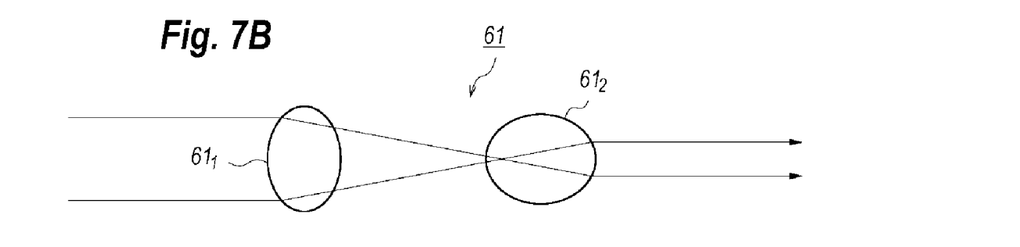

The partial wavelength multiplexed signals, one of which transmits the WSF 24 as the partial wavelength multiplexed signal; while, the other is reflected thereby as the another partial wavelength multiplexed signal, respectively enter the lens units, 61 and 62, where a function or a mechanism thereof is shown in FIG. 7A and/or FIG. 7B. That is, the lens unit, 61 and 62, shown in FIG. 7A provides two convex surfaces, 61a and 61b, opposite to each other along the optical axis thereof, where the convex surfaces have curvatures different from each other; that is, the convex surface 61a, into which the partial wavelength multiplexed signal enters, has a curvature smaller than a curvature of the other convex surface 61b, from which the partial wavelength multiplexed signal outputs. An optical beam entering the input convex surface 61a converges so as to form an image at a point of a focal point for the input convex surface 61a; then, diverges toward the other convex surface 61b. The diverged wavelength multiplexed signal output from the second convex surface 61b becomes a substantially collimated beam or a concentrated beam with a beam having at a point enough apart from the second convex surface 61b. Adjusting the curvatures of the two convex surfaces, 61a and 61b, and a span therebetween; the output wavelength multiplexed signal may have an optional beam diameter. That is, the input convex surface 61a and the output convex surface 61b are formed such that respective focal points coincide. The lens units, 61 and 62, thus described may have another arrangement, for instance, the lens units, 61 and 62, may have two concentrating lenses, $61_1$ and $61_2$, each having focal lengths different from each other but two lenses, $61_1$ and $61_2$, are placed such that respective focal points coincide, as shown in FIG. 7B. Such a two-lens system for the lens units, 61 and 62, may show the same function described above for FIG. 7A.

Figure 8:
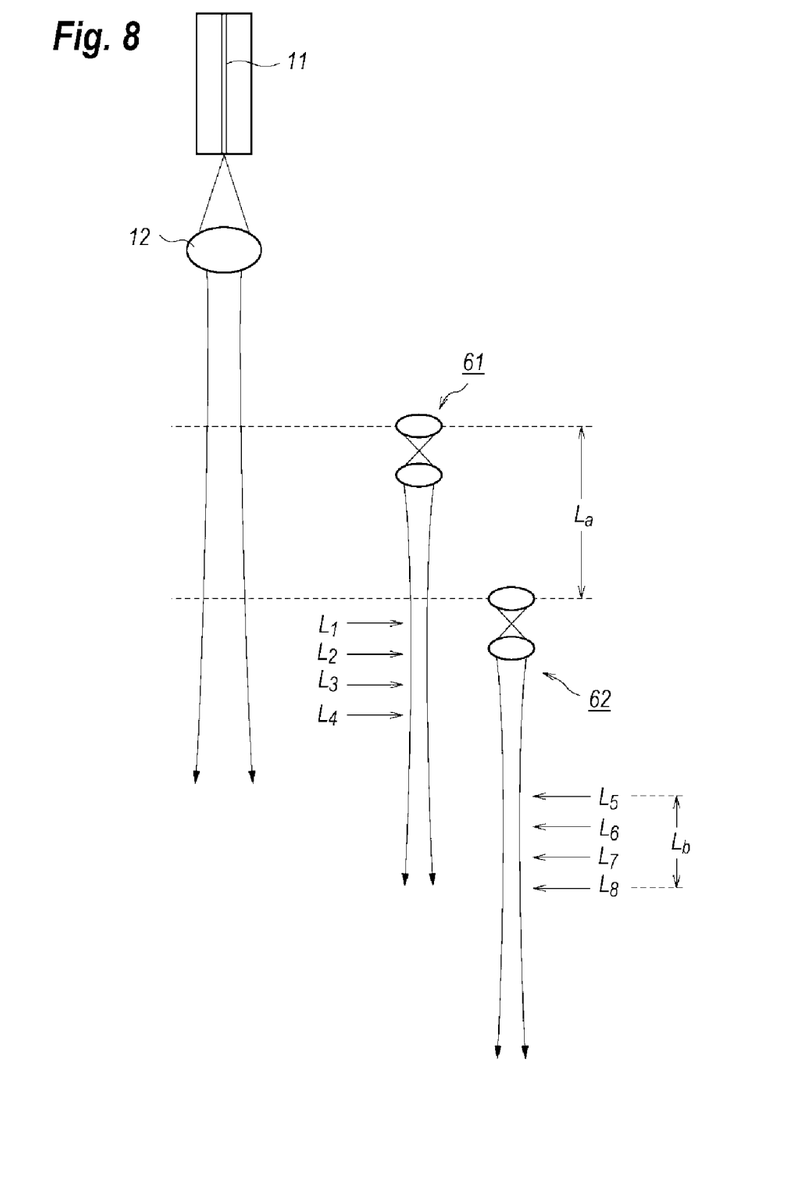

FIG. 8 schematically illustrates the optical de-coupling system implementing the lens units, 61 and 62, in particular, the profiles of the beam diameters in a portion downstream of the lens units, 61 and 62. The first lens unit 61 may adjust the beam diameter of the partial wavelength multiplexed signal output from the first lens 12 and transmitted through the WSF 24, while, the second lens unit 62 may also adjust the beam diameter of the another partial wavelength multiplexed signal output from the first lens 12 and reflected by the WSF 24. The two lens units, 61 and 62, may adjust the beam diameters output therefrom substantially same to each other. Accordingly, the two O-DeMuxes, 31 and 32, may receive respective wavelength multiplexes signals with beam diameters substantially equal to each other. The two O-DeMuxes, 31 and 32, may show the wavelength de-multiplexing function substantially same to each other. Thus, the two lens units, 61 and 62, may compensate the optical path difference $L_a$ between the two wavelength multiplexed signals. The embodiment shown in FIG. 8 implements two lens units, 61 and 62; that is, the respective partial wavelength multiplexed signals are adjusted in the beam diameters thereof independently by the two lens units, 61 and 62. However, the optical de-coupling system may implement only one lens unit for the another partial wavelength multiplexed signal having the longer optical path, because the longer optical path may increase the beam diameter greater than the beam diameter in the shorter optical path.

Also, the optical de-coupling system implementing the lens units, 61 and 62, is unnecessary to set the beam waist to be midway between the longest path and the shortest path because the lens units, 61 and 62, may adjust the beam diameters. Also, referring to FIG. 6, two O-DeMuxes, 31 and 32, are arranged such that the input ports thereof, 31a and 32a, are inmost, which may set a span between the partial wavelength multiplexed signals short.

Second Embodiment

Figure 9:
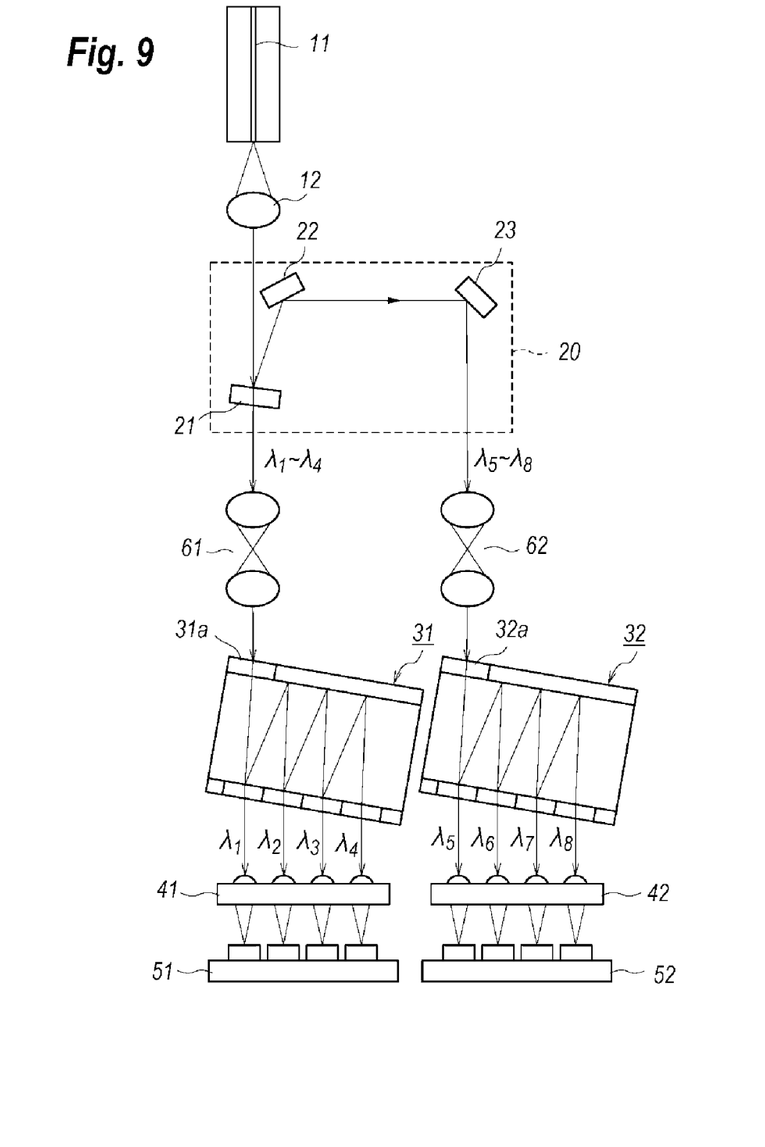
FIG. 9 schematically illustrates another arrangement of the wavelength de-multiplexing system according to second embodiment of the present invention.

FIG. 9 schematically illustrates another arrangement of the wavelength de-multiplexing system according to second embodiment of the present invention. The arrangement shown in FIG. 9 has a feature that the two O-DeMuxes, 31 and 32, are arranged so as to make a parallel translation. Because the wavelength de-multiplexing system shown in FIG. 9 disposes two O-DeMuxes, 31 and 32, in parallel; the optical path difference $L_a$ between two optical axes becomes longer than that defined in the arrangement shown in FIG. 6. The WS unit 20 has the same arrangement and the function with those appearing in the arrangement shown in FIG. 2.

Third Embodiment

Figure 10:
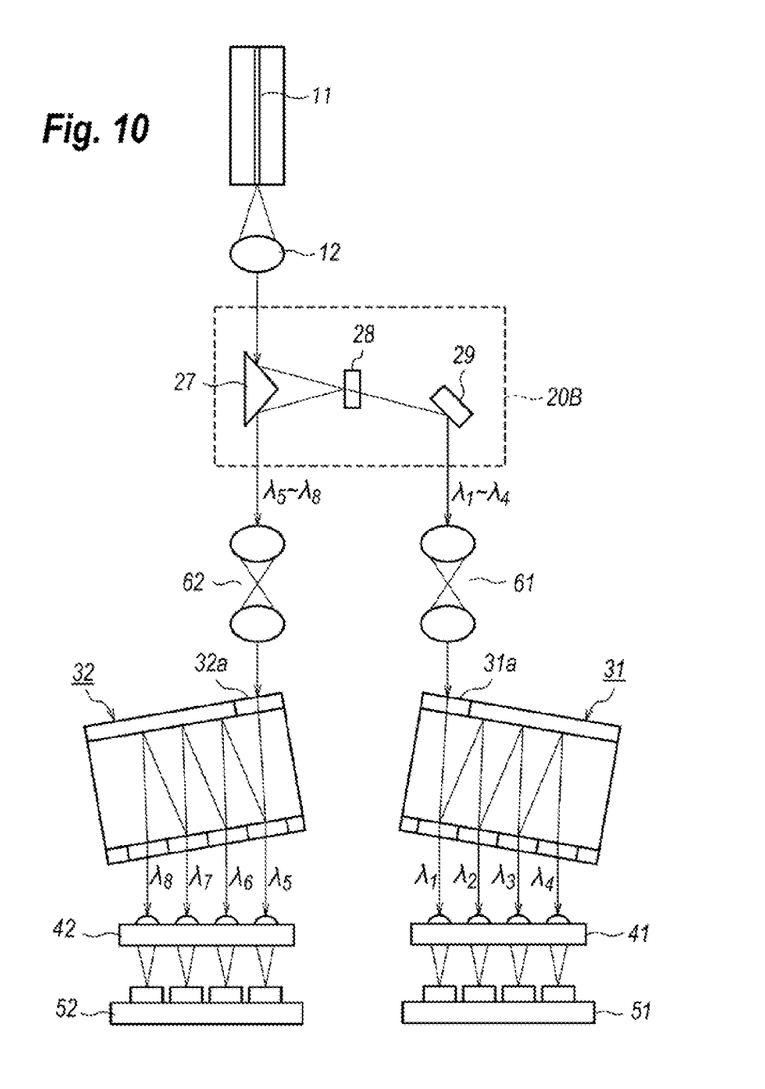
FIG. 10 schematically shows still another arrangement of the wavelength de-multiplexing system according to third embodiment of the present invention.

FIG. 10 schematically shows still another arrangement of the wavelength de-multiplexing system according to the third embodiment of the present invention. The system shown in FIG. 10 has a feature that the WS unit 20B has an arrangement different from those, 20 and 20A, appearing in the aforementioned examples. That is, the WS unit 20B of the present embodiment provides a prism 27, a WSF 28, and a mirror 29. The prism 27, which has an isosceles triangle with a vertex of an obtuse angle, reflects the wavelength multiplexed signal coming from the first lens 12 toward the WSF 28. The WSF 28 may transmit some of the optical signals having shorter wavelengths; while, reflect rest of the optical signals having longer wavelengths. The rest of the optical signals is reflected again by the prism 27 and finally enters the second O-DeMux 32. The partial wavelength multiplexed signal transmitting the WSF 27 is reflected by the mirror 29, and finally enter the first O-DeMux 31. Two partial wavelength multiplexed signals each entering the first and second O-DeMuxes, 31 and 32, have optical axes parallel to each other after being reflected by the mirror 29 and the prism 27, respectively. Accordingly, shifting a set of the mirror 29, the lens unit 61, the first O-DeMux 31, a portion of the arrayed lens 42, and a portion of the arrayed PD 52, the optical path for the first O-DeMux 31 from the WSF 28 to the first O-DeMux 31 may be equal to the other optical path for the second O-DeMux 32 from the WSF 28 to the second O-DeMux 32. In the arrangement shown in FIG. 10, the vertex angle of the prism 27 is set such that the incident angle of the wavelength multiplexed signal coming from the first lens 12 becomes smaller than 20°, preferably smaller than 15°.

Although this invention has been described in certain specific exemplary embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents.

What is claimed is:

1. A wavelength de-multiplexing system that receives a wavelength multiplexed signal multiplexing optical signals each having wavelengths different from each other and generates electrical signals corresponding to the optical signals, the wavelength de-multiplexing system comprising:
a lens that receives the wavelength multiplexed signal and converts the wavelength multiplexed signal into a quasi-collimated beam;
a lens unit that receives the quasi-collimated beam and outputs a quasi-collimated beam with a diameter smaller than a diameter of the quasi-collimated beam output from the lens; and
an optical de-multiplexer that de-multiplexes the quasi-collimated beam output from the lens unit, the optical de-multiplexer including a plurality of wavelength selective filters each having optical distances against the lens unit different from each other.

2. The wavelength de-multiplexing system according to claim 1,
wherein the lens unit provides an input convex surface that receives the quasi-collimated beam output from the lens and an output convex surface that outputs the quasi-collimated beam to the optical de-multiplexer, and
wherein the input convex surface has a curvature smaller than a curvature of the output convex surface.

3. The wavelength de-multiplexing system according to claim 2,
wherein the input convex surface and the output convex surface are arranged that the output convex surface in a focal point thereof coincides with a focal point of the input convex surface.

4. The wavelength de-multiplexing system according to claim 1,
wherein the lens unit includes an input concentrating lens and an output concentrating lens, the input concentrating lens having a focal length longer than a focal length of the output concentrating lens, and
wherein the output concentrating lens is placed on a point where the output concentrating lens in a focal point thereof coincides with a focal point of the input concentrating lens.

* * * * *